UNITED STATES PATENT OFFICE.

ROBERT McCAFFERTY, OF LANCASTER, PENNSYLVANIA.

IMPROVEMENT TO PREVENT INCRUSTATIONS IN STEAM-BOILERS.

Specification forming part of Letters Patent No. 17,046, dated April 14, 1857.

*To all whom it may concern:*

Be it known that I, ROBERT MCCAFFERTY, of Lancaster city, county of Lancaster, and State of Pennsylvania, have discovered and invented a new and Improved Mode of Preventing the Incrustation of Steam-Boilers; and I do hereby declare that the following is a full and exact description thereof.

To enable others skilled in the art to use my discovery and invention, I will proceed to describe the process and mode of using the same.

My object is to prevent and remove the incrustation of steam-boilers and steam-generators. I therefore use the dark or which is commonly called the "black" gum-catechu, (well known to dyers as a coloring-matter.) I put a half-pound of this gum-catechu into a steam-boiler of one hundred horse power, until the water becomes the color of pale brandy or a light reddish-brown color, and during the week I keep the water as near that color as possible by adding daily small pieces of the gum-catechu; and I discovered that so long as the water retained that color no lime or incrustation accumulated on the sides of the boiler, and the boiler was kept perfectly clean; and I discovered that it was not necessary to use any more gum-catechu than was barely sufficient to keep the water tinged to a light reddish-brown color. Again I tested my discovery and process by using the gum-catechu in the same quantities and manner in steam-boilers where the incrustation was uncommonly thick, and I decomposed the lime and destroyed the incrustation, so that the lime and incrustation were forced off from the sides of the boilers and deposited in a kind of slush on the bottom, from whence the slush was easily washed away by the blow-off cock, and the inside of the boiler was thus perfectly cleansed.

I am aware that sawdust and other material have been used for the purpose of preventing and removing the incrustation in steam-boilers; but they choke up and are more expensive than my process, and I extract and not add to the matter that collects in the boilers, and thus I save the trouble attending the cleaning of the boiler, the expense of the daily increase of fuel, and the destruction of boilers.

What I claim as my discovery, and desire to secure by Letters Patent, is—

The application and use of gum-catechu to prevent and remove the incrustation in steam-boilers and steam-generators, in the mode and quantities herein described.

ROBERT McCAFFERTY.

Witnesses:
J. FRANKLIN REIGART,
M. CARPENTER.